(12) United States Patent
Chithambaram et al.

(10) Patent No.: US 8,095,937 B1
(45) Date of Patent: Jan. 10, 2012

(54) METHODS AND APPARATUS PROVIDING PAYLOAD EVENT PROCESSING FOR MANAGED OBJECTS

(75) Inventors: Saravanan Chithambaram, Cambridge, MA (US); Steven S. Teng, Littleton, MA (US); Richard T. Simon, Brighton, MA (US)

(73) Assignee: EMC Corporation, Hopkinton, MA (US)

( * ) Notice: Subject to any disclaimer, the term of this patent is extended or adjusted under 35 U.S.C. 154(b) by 1482 days.

(21) Appl. No.: 11/389,786

(22) Filed: Mar. 27, 2006

(51) Int. Cl.
G06F 3/00 (2006.01)
G06F 9/44 (2006.01)
G06F 9/46 (2006.01)
G06F 13/00 (2006.01)

(52) U.S. Cl. ..................... 719/316; 719/318
(58) Field of Classification Search ............... 719/316, 719/318
See application file for complete search history.

(56) References Cited

U.S. PATENT DOCUMENTS

| 6,618,373 | B1 * | 9/2003 | Subramaniam | 370/390 |
| 6,978,302 | B1 * | 12/2005 | Chisholm et al. | 709/224 |
| 2005/0015472 | A1 * | 1/2005 | Catania et al. | 709/223 |
| 2005/0038772 | A1 * | 2/2005 | Colrain | 707/1 |

* cited by examiner

*Primary Examiner* — Emerson Puente
*Assistant Examiner* — Kimbleann Verdi
(74) *Attorney, Agent, or Firm* — Krishnendu Gupta; Gerald P. Kazanjian

(57) ABSTRACT

A system receives notification that a console has registered to receive a type of managed object event. The system receives a plurality of managed object events from a cache manager. Each managed object event is associated with a managed object. The system parses the plurality of managed object events to determine the type of managed object event for each of the plurality of managed object events, and distributes the plurality of managed object events to the console. The plurality of managed object events are distributed based on the type of managed object event associated with each managed object event within the plurality of managed objects events, and the type of managed object event the console has previously registered to receive.

18 Claims, 5 Drawing Sheets

```
┌─────────────────────────────────────────────────────────────────────┐
│ 206 RECEIVE NOTIFICATION THAT A CONSOLE HAS REGISTERED TO RECEIVE   │
│ A TYPE OF MANAGED OBJECT EVENT                                      │
│  ┌───────────────────────────────────────────────────────────────┐  │
│  │ 207 RECEIVE NOTIFICATION THAT A PLURALITY OF SUB              │  │
│  │ PROCESSES OPERATING ON THE CONSOLE HAS REGISTERED             │  │
│  │ TO RECEIVE THE TYPE OF MANAGED EVENT                          │  │
│  └───────────────────────────────────────────────────────────────┘  │
│                              │                                       │
│                              ▼                                       │
│  ┌───────────────────────────────────────────────────────────────┐  │
│  │ 208 TRANSLATE THE TYPE OF MANAGED EVENT TO AN OBJECT          │  │
│  │ KEY                                                           │  │
│  └───────────────────────────────────────────────────────────────┘  │
│                              │                                       │
│                              ▼                                       │
│  ┌───────────────────────────────────────────────────────────────┐  │
│  │ 209 ADD THE OBJECT KEY TO A MANAGED OBJECT KEY TABLE          │  │
│  └───────────────────────────────────────────────────────────────┘  │
│                                                                     │
│                               OR                                    │
│                                                                     │
│  ┌───────────────────────────────────────────────────────────────┐  │
│  │ 210 RECEIVE NOTIFICATION THAT A CONSOLE HAS POWERED           │  │
│  │ UP                                                            │  │
│  └───────────────────────────────────────────────────────────────┘  │
│                                                                     │
│                               OR                                    │
│                                                                     │
│  ┌───────────────────────────────────────────────────────────────┐  │
│  │ 211 RECEIVE A SELECTION FROM A USER TO VIEW A MANAGED         │  │
│  │ OBJECT                                                        │  │
│  └───────────────────────────────────────────────────────────────┘  │
└─────────────────────────────────────────────────────────────────────┘
```

METHODS AND APPARATUS PROVIDING PAYLOAD EVENT PROCESSING FOR MANAGED OBJECTS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction.

SUMMARY

Conventional technologies for Storage Resource Management solutions suffer from a variety of deficiencies. In particular, conventional technologies for Storage Resource Management solutions are limited in that framework handlers that receive managed object events from a cache manager, and deliver those managed object events to console applications, can only process single managed object events. Recent advancements in Storage Resource Management solutions have resulted in bundling multiple managed object events into payload objects transmitted from the cache manager to the framework handlers. Thus, the framework handlers that deliver managed object data to console applications cannot process the payload objects (containing multiple managed object events bundled together) received from the cache manager.

Embodiments disclosed herein significantly overcome deficiencies of conventional technologies and provide a system that includes a computer system executing a managed object events distributing process. The managed object events distributing process, operating within a clearinghouse, receives a payload object from a cache manager, and distributes the managed object events within the payload object based on those managed object events the console has previously registered to receive.

The payload object contains a plurality of managed object events bundled together. Each managed object event is associated with a managed object. A managed object selection represents a resource in a storage area network (SAN). The managed objects have software agents (i.e., software processes) running on the managed objects. The agents listen for events that occur on the managed objects. When an event occurs, the agents transmit information associated with those events to the database. The events are inserted into the database. A cache manager bundles the managed object events (previously inserted into the database) into payload objects.

The managed object events are group by managed object event topic (such as add managed object, removed managed object, modify managed object, modify a relationship associated with a managed object, etc), and managed object event class (such as host, memory, switch, etc). Thus, there is one managed object event topic per payload object and one managed object event class per payload object. The cache manager then transmits the payload object to the clearinghouse operating the managed object events distributing process.

The managed object events distributing process parses each payload object to determine the managed object event topic and managed object event class associated with each payload object. The console registers to receive managed object events associated with a managed object event topic (such as add managed object, removed managed object, modify managed object, modify a relationship associated with a managed object, etc), and/or managed object event class (such as host, memory, switch, etc). The managed object events distributing process then distributes to the console those individual managed object events the console registered to receive.

Embodiments disclosed include a computer system executing a managed object events distributing process. The managed object events distributing process receives notification that a console has registered to received a type of managed object event. The managed object events distributing process receives a plurality of managed object events from a cache manager where each managed object event is associated with a managed object. The managed object events distributing process parses the plurality of managed object events to determine the type of managed object event for each of the plurality of managed object events, and distributes the plurality of managed object events to the console. The managed object events distributing process distributes plurality of managed object events to the console based on the type of managed object event associated with each managed object event within the plurality of managed objects events, and the type of managed object event the console has previously registered to receive. In one embodiment, the managed object events distributing process receives notification that the console has de-registered to receive the type of managed object event.

During an example operation of one embodiment, suppose a system administrator, operating a console, registers to receive managed object events indicating when a selected host has been modified. Storage area network management applications listen for changes on the selected host. When a change occurs, the storage area network management applications transmit information related to those changes (on the selected host) to the database. Insertion into the database of the host changes triggers a cache manager application to group the host changes by managed object event topic (i.e., managed object modified), and managed object event class (i.e., host), and then bundle the host changes by managed object event topic and managed object event class. The managed object events distributing process, operating within a clearinghouse, receives the payload object. The managed object events distributing process identified the payload object's managed object event topic (i.e., managed object modified) and managed object event class (i.e., host). The managed object events distributing process identifies the console (operated by the system administrator) has previously registered to receive managed object events associated with changes on the selected host. The managed object events distributing process then distributes the host changes, associated with the selected host, (i.e., managed object events) to the framework handlers that will process the host changes, and deliver those host changes, associated with the selected host, (i.e., managed object events) to the console.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the managed object events distributing process receives notification that a console has registered to receive a type of managed object event, according to one embodiment disclosed herein.

DETAILED DESCRIPTION

Figure 1:
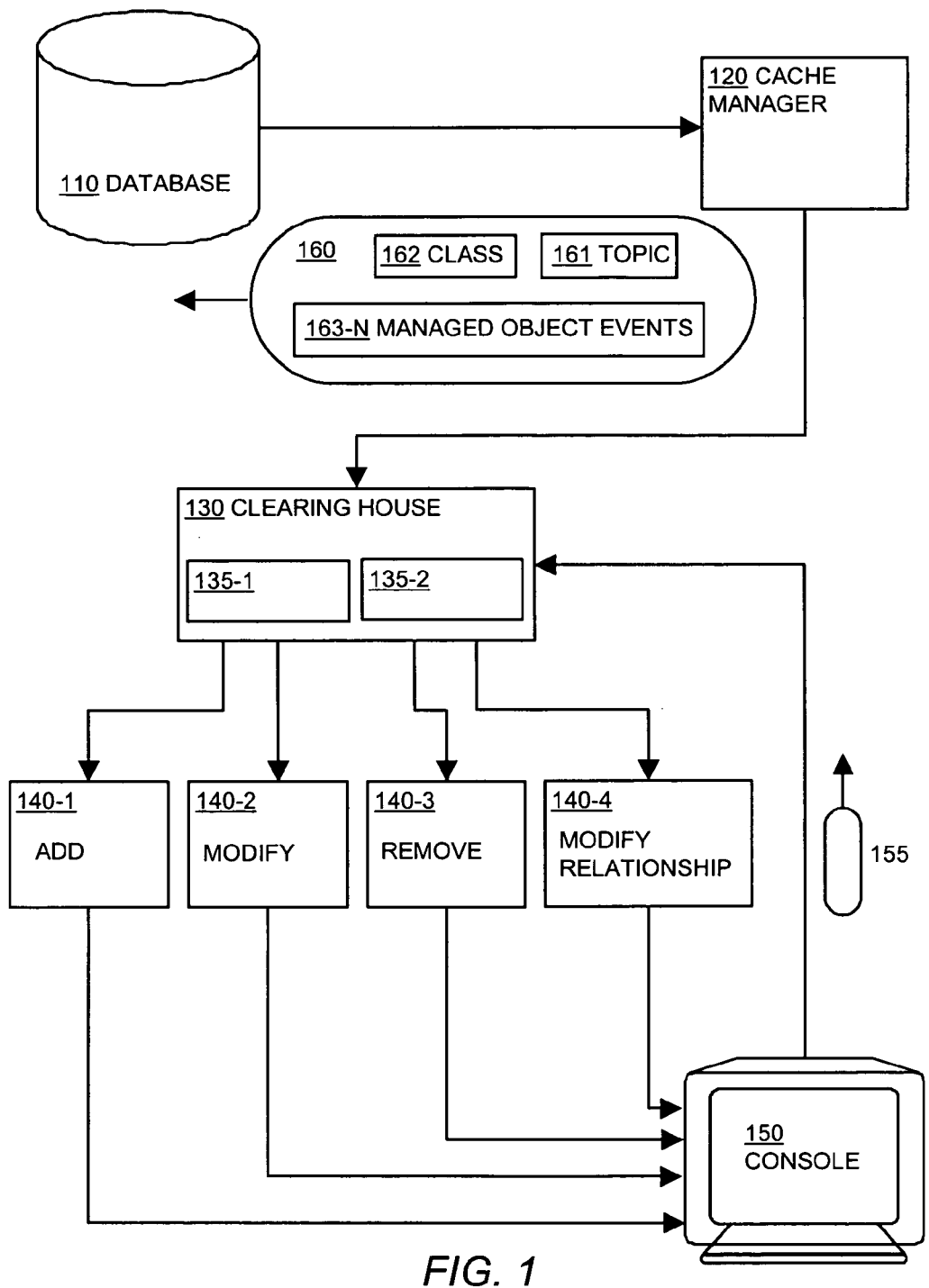
FIG. 1 shows a high-level block diagram of a computer system according to one embodiment disclosed herein.

Embodiments disclosed herein include methods and a computer system that perform a managed object events distributing process. The managed object events distributing process, operating within a clearinghouse, receives a payload object from a cache manager, and distributes the managed object events within the payload based on those managed object events the console has previously registered to receive.

The payload object contains a plurality of managed object events bundled together. Each managed object event is associated with a managed object. A managed object selection represents a resource in a storage area network (SAN). The managed objects have software agents (i.e., software processes) running on the managed objects. The agents listen for events that occur on the managed objects. When an event occurs, the agents transmit information associated with those events to the database. The events are inserted into the database. A cache manager bundles the managed object events (previously inserted into the database) into payload objects. The managed object events are group by managed object event topic (such as add managed object, removed managed object, modify managed object, modify a relationship associated with a managed object, etc), and managed object event class (such as host, memory, switch, etc). Thus, there is one managed object event topic per payload object and one managed object event class per payload object. The cache manager then transmits the payload object to a clearinghouse operating the managed object events distributing process.

The managed object events distributing process parses each payload object to determine the managed object event topic and managed object event class associated with each payload object. The console registers to receive managed object events associated with a managed object event topic (such as add managed object, removed managed object, modify managed object, modify a relationship associated with a managed object, etc), and/or managed object event class (such as host, memory, switch, etc). The managed object events distributing process then distributes those individual managed object events the console registered to receive.

Embodiments disclosed include a computer system executing a managed object events distributing process. The managed object events distributing process receives notification that a console has registered to received a type of managed object event. The managed object events distributing process receives a plurality of managed object events from a cache manager where each managed object event is associated with a managed object. The managed object events distributing process parses the plurality of managed object events to determine the type of managed object event for each of the plurality of managed object events, and distributes the plurality of managed object events to the console. The managed object events distributing process distributes plurality of managed object events to the console based on the type of managed object event associated with each managed object event within the plurality of managed objects events, and the type of managed object event the console has previously registered to receive. In one embodiment, the managed object events distributing process receives notification that the console has de-registered to receive the type of managed object event.

FIG. 1 is a block diagram illustrating example architecture of a clearing house 130 computer system that executes, runs, interprets, operates or otherwise performs a managed object events distributing application 135-1 and managed object events distributing process 135-2 suitable for use in explaining example configurations disclosed herein. The clearing house 130 computer system may be any type of computerized device such as a personal computer, workstation, portable computing device, console, laptop, network terminal or the like. The clearinghouse 130 computer system contains a memory system (i.e., any type of computer readable medium), and in this example, is encoded with a managed object events distributing application 135-1 as explained herein. The managed object events distributing application 135-1 may be embodied as software code such as data and/or logic instructions (e.g., code stored in the memory or on another computer readable medium such as a removable disk) that supports processing functionality according to different embodiments described herein. During operation of the clearinghouse 130 computer system, a processor accesses the memory system via an interconnect in order to launch, run, execute, interpret or otherwise perform the logic instructions of the managed object events distributing application 135-1. Execution of the managed object events distributing application 135-1 in this manner produces processing functionality in a managed object events distributing process 135-2. In other words, the managed object events distributing process 135-2 represents one or more portions or runtime instances of the managed object events distributing application 135-1 (or the entire managed object events distributing application 135-1) performing or executing within or upon the processor in the clearinghouse 130 computer system at runtime.

It is noted that example configurations disclosed herein include the managed object events distributing application 135-1 (i.e., in the form of un-executed or non-performing logic instructions and/or data). The managed object events distributing application 135-1 may be stored on a computer readable medium (such as a floppy disk), hard disk, electronic, magnetic, optical, or other computer readable medium. The managed object events distributing application 135-1 may also be stored in a memory system such as in firmware, read only memory (ROM), or, as in this example, as executable code in, for example, Random Access Memory (RAM). In addition to these embodiments, it should also be noted that other embodiments herein include the execution of the managed object events distributing application 135-1 in the processor as the managed object events distributing process 135-2. Those skilled in the art will understand that the clearinghouse 130 computer system may include other processes and/or software and hardware components, such as an operating system not shown in this example.

The clearinghouse 130 computer system receives a payload object 160 from a cache manager 120. The cache manager 120 receives managed object events 163-N from a database 110, and bundles the managed object events 163-N into the payload object 160. The payload object 160 contains a managed object event class 162, a managed object event topic 161, and a plurality of managed object events 163-N. The managed object events distributing process 135-2 operates on the clearinghouse 130 computer system, and parses the payload object 160 to identify the managed object event class 162 and managed object event topic 161 of the managed object events 163-N contained within the payload object 160. The managed object events distributing process 135-2 distributes the managed object events 163-N to framework handlers 140-N that then transmit to the console 150 those managed object events 163-N the console 150 has previously registered to receive. The managed object events distributing process 135-2 receives notification 155 from the console 150 identifying the managed object events 163-N the console 150 has registered to receive.

Further details of configurations explained herein will now be provided with respect to a flow chart of processing steps that show the high level operations disclosed herein to perform the managed object events distributing process 135-2.

Figure 2:
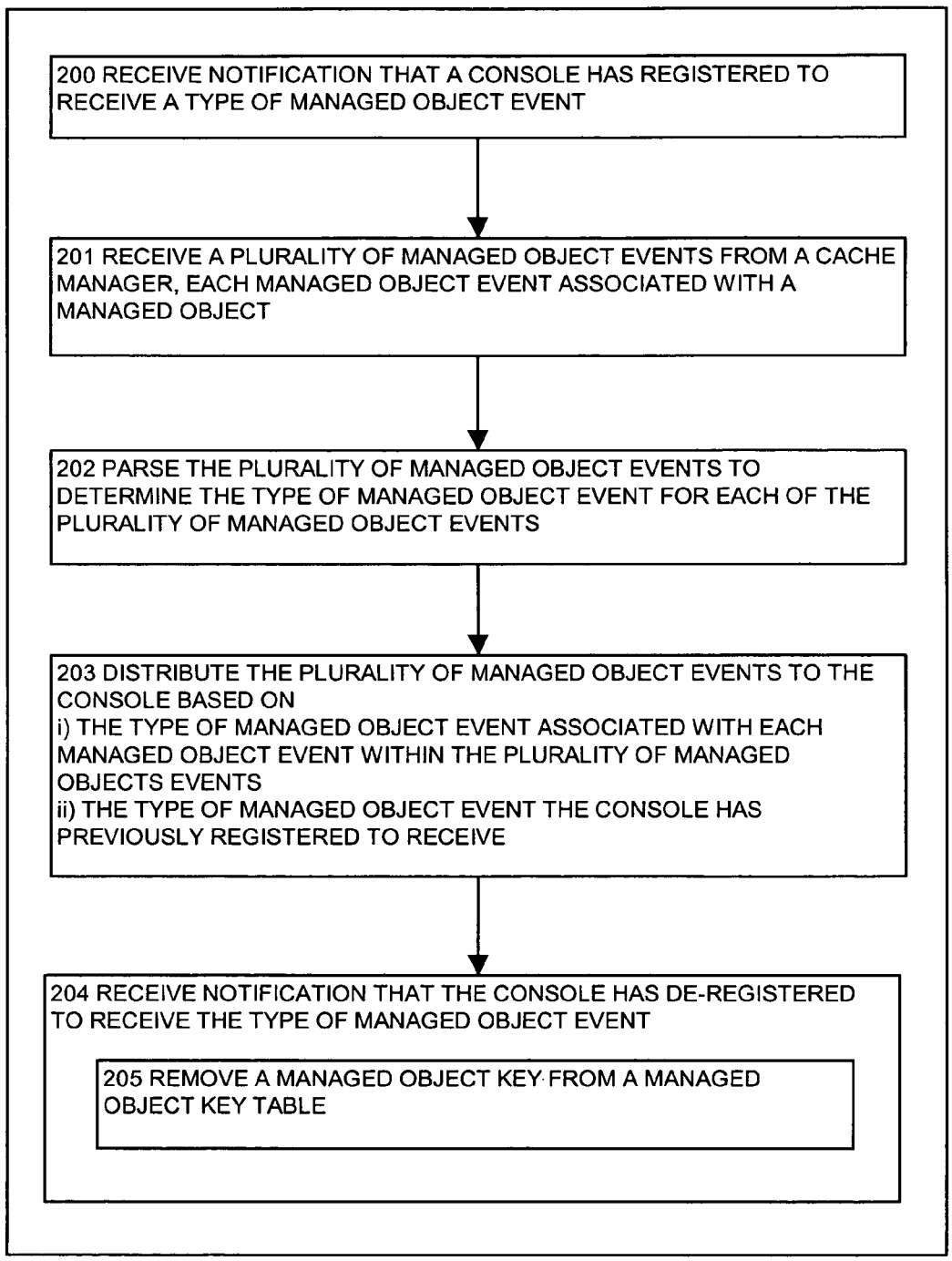
FIG. 2 illustrates a flowchart of a procedure performed by the system of FIG. 1 when the managed object events distributing process receives notification that a console has registered to receive a type of managed object event, and receives a payload object of managed object events from a cache manager, according to one embodiment disclosed herein.

FIG. 2 is a flowchart of the steps performed by the managed object events distributing process 135-2 when it receives notification that a console 150 has registered to receive a type of managed object event 163-N, and receives a payload object 160 of managed object events 163-N from a cache manager 120.

In step 200, the managed object events distributing process 135-2 receives notification 155 that a console 150 has registered to receive a type of managed object event 163-N. The console 150 registers to received managed object events 163-N based on the managed object event class 162 and the managed object event topic 161 associated with those managed object events 163-N. For example, a managed object event topic 161 could include add managed object, remove managed object, modify managed object, modify a relationship associated with a managed object, etc, and a managed object event class 162 could include a host, memory, switch, etc. In an example embodiment, there exists only one clearinghouse 130 computer system associated with the console 150, however, the database 110 can have more than one clearinghouse 130 computer system (and associated console 150) retrieving information from the database 110.

In step 201, the managed object events distributing process 135-2 receives a plurality of managed object events 163-N from a cache manager 120. Each managed object event 163-1 is associated with a managed object. A managed object selection represents a resource in a storage area network (SAN). The managed objects have software agents (i.e., software processes) running on the managed objects. The agents listen for events that occur on the managed objects. When an event occurs, the agents transmit information associated with those events to the database 110. The events are inserted into the database 110, triggering a cache manager application to group the managed object events by managed object event topic 161 (i.e., add managed object, remove managed object, modify managed object, modify a relationship associated with a managed object, etc), and managed object event class 162 (i.e., host, memory, switch, etc.). The cache manager application then bundles the managed object events by managed object event topic 161 and managed object event class 162 into a payload object 160. The managed object events distributing process 135-2, operating within a clearinghouse 130 computer system, receives the payload object 160 containing a plurality of managed object events 163-N.

In step 202, the managed object events distributing process 135-2 parses the plurality of managed object events 163-N to determine the type of managed object event for each of the plurality of managed object events 163-N. In an example embodiment, a cache manager application groups managed object events by managed object event topic 161 (i.e., add managed object, remove managed object, modify managed object, modify a relationship associated with a managed object, etc), and managed object event class 162 (i.e., host, memory, switch, etc.). The cache manager application then bundles the managed object events by managed object event topic 161 and managed object event class 162 into a payload object 160, and transmits the payload object 160 (containing the plurality of managed object events 163-N) to the clearinghouse 130 computer system. The managed object events distributing process 135-2, operating on the clearinghouse 130 computer system, parses the plurality of managed object events 163-N contained within the payload object 160, to determine the type of managed object event for each of the plurality of managed object events 163-N. The type of managed object event can include a managed object event topic 161 (i.e., add managed object, remove managed object, modify managed object, modify a relationship associated with a managed object, etc), and a managed object event class 162 (i.e., host, memory, switch, etc.).

In step 203, the managed object events distributing process 135-2 distributes the plurality of managed object events 163-N to the console 150 based on the type of managed object event associated with each managed object event 163-1 within the plurality of managed objects events 163-N (contained within the payload object 160), and the type of managed object event the console 150 has previously registered to receive. In an example embodiment, the managed object events distributing process 135-2, operating on the clearinghouse 130 computer system, receives a payload object 160 (containing the plurality of managed object events 163-N). The managed object events distributing process 135-2 parses the plurality of managed object events 163-N contained within the payload object 160, to determine the type of managed object event for each of the plurality of managed object events 163-N. The type of managed object event can include a managed object event topic 161 (i.e., add managed object, remove managed object, modify managed object, modify a relationship associated with a managed object, etc), and a managed object event class 162 (i.e., host, memory, switch, etc.). Based on the type of managed object event the console 150 has previously registered to receive, the managed object events distributing process 135-2 distributes the plurality of managed object events 163-N to the console 150 based on the managed object events 163-N. In an example embodiment, the type of managed object event can include a managed object event topic 161 (i.e., add managed object, remove managed object, modify managed object, modify a relationship associated with a managed object, etc), and a managed object event class 162 (i.e., host, memory, switch, etc.) of the managed object events 163-N.

In step 204, the managed object events distributing process 135-2 receives notification that the console 150 has de-registered to receive the type of managed object event. In an example embodiment, a console 150 can register or de-register to receive managed object events. The managed object events distributing process 135-2 receives notification that the console 150 has de-registered to receive the type of managed object event, for example, managed object events associated with adding a host. Thus, when the managed object events distributing process 135-2 receives a payload object 160 containing managed object events 163-N associated with adding a host, the managed object events distributing process 135-2 will not distribute the managed object events 163-N to the console 150, but, rather, will ignore those managed object events 163-N.

In step 205, the managed object events distributing process 135-2 removes a managed object key from a managed object key table. In an example embodiment, the console 150 registers to receive the type of managed object event, for example, managed object events associated with adding a host. In another example embodiment, the console 150 de-registers to receive the type of managed object event (i.e., managed object events associated with adding a host). When the console 150 registers to receive a type of managed object event, the type of managed object event is mapped to a managed object key. The managed object events distributing process 135-2 inserts the managed object key into a managed object key table. When the console 150 de-registers for to receive a type of managed object event, the managed object events distributing process 135-2 removes the managed object key from the managed object key table.

FIG. 3 is a flowchart of the steps performed by the managed object events distributing process 135-2 when it receives notification 155 that a console 150 has registered to receive a type of managed object event.

In step 206, the managed object events distributing process 135-2 receives notification 155 that a console 150 has registered to receive a type of managed object event 163-N. The console 150 registers to received managed object events 163-N based on the managed object event class 162 and the managed object event topic 161 associated with those managed object events 163-N. For example, a managed object event topic 161 could include add managed object, remove managed object, modify managed object, modify a relationship associated with a managed object, etc, and a managed object event class 162 could include a host, memory, switch, etc. In an example embodiment, there exists only one clearinghouse 130 computer system associated with the console 150, however, the database 110 can have more than one clearinghouse 130 computer system (and associated console 150) retrieving information from the database 110.

In step 207, the managed object events distributing process 135-2 receives notification 155 that a plurality of sub processes operating on the console 150 has registered to receive the type of managed object event. In an example embodiment, there exist a plurality of sub processes operating on the console 150. The sub processes operate to process the managed object events 163-N. For example, a managed object event 163-1 contains information pertaining to an added host. A sub process, operating on the console 150, receives the managed object event 163-1, and updates the console 150 with the information associated with the added host. Thus, when a system administrator views the console 150, an icon representing the added host, will be displayed on the console 150. A system administrator can access the icon representing the added host to perform actions on that added host, or to view additional information associated with the added host. Each of the plurality of sub processes can register to receive managed object events 163-N. Multiple sub processes can register to receive the same managed object events 163-N.

In step 208, the managed object events distributing process 135-2 translates the type of managed event to an object key. In an example embodiment, the sub processes register to receive a type of managed object event, and the type of managed object event is mapped to a managed object key. Different sub processes operating on the console 150 can register for the same manage object key.

In step 209, the managed object events distributing process 135-2 adds the object key to a managed object key table In an example embodiment, the sub processes register to receive a type of managed object event, and the type of managed object event is mapped to a managed object key. For each type of managed object event 163-1 the sub processes register to receive, the managed object events distributing process 135-2 inserts a managed object key into a managed object key table associated with that managed object event 163-1.

Alternatively, in step 210, the managed object events distributing process 135-2 receives notification that a console 150 has powered up. In an example embodiment, the managed object events distributing process 135-2 receives notification that a console 150 has powered up. During powering up of the console, sub processes operating on the console 150 register to receive managed object events 163-N.

Alternatively, in step 211, the managed object events distributing process 135-2 receives a selection from a user to view a managed object. In an example embodiment, a user, such as a system administrator, operates the console 150 to view information related to various managed objects. For example, a user can open a view that displays, for example, icons representing all hosts, or a specific host. As the system administrator makes a selection to view all hosts, the managed object events distributing process 135-2 receives notification that the console 150 has registered to receive managed object events 163-N associated with that host. In an example embodiment, the system administrator makes a selection to view all the hosts, and then closes that view to display all the switches. The managed object events distributing process 135-2 receives managed object events 163-N related to the hosts, and distributes them to the console 150. Thus, when the system administrator closes the view to display all the switches, and opens the view to display all the hosts, the view displaying all the hosts is updated with the managed object events 163-N received from the managed object events distributing process 135-2 while the system administrator was viewing the view to display all the switches.

Figure 4:
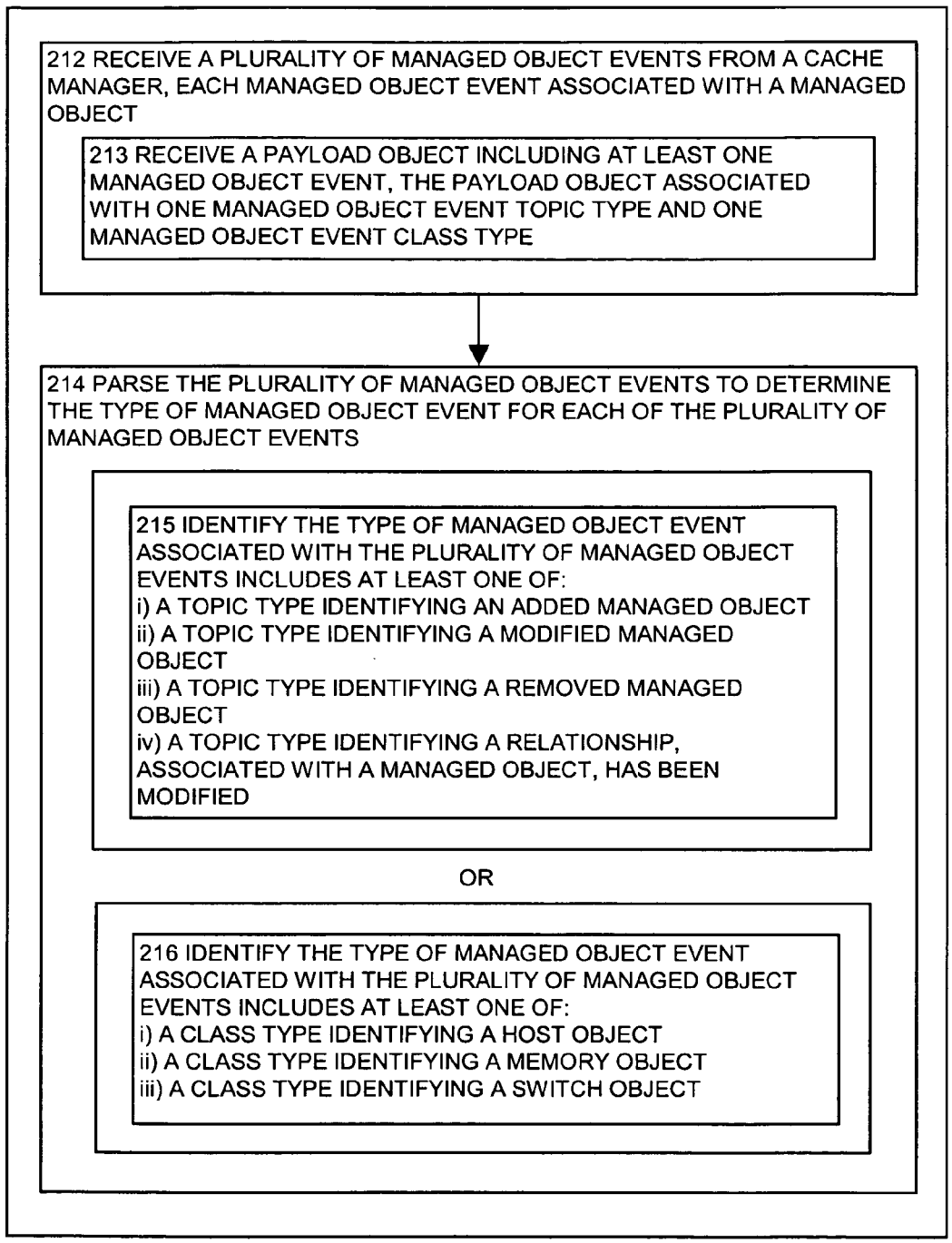
FIG. 4 illustrates a flowchart of a procedure performed by the system of FIG. 1 when the managed object events distributing process receives a plurality of managed object events from a cache manager, each managed object event associated with a managed object, according to one embodiment disclosed herein.
Figure 5:
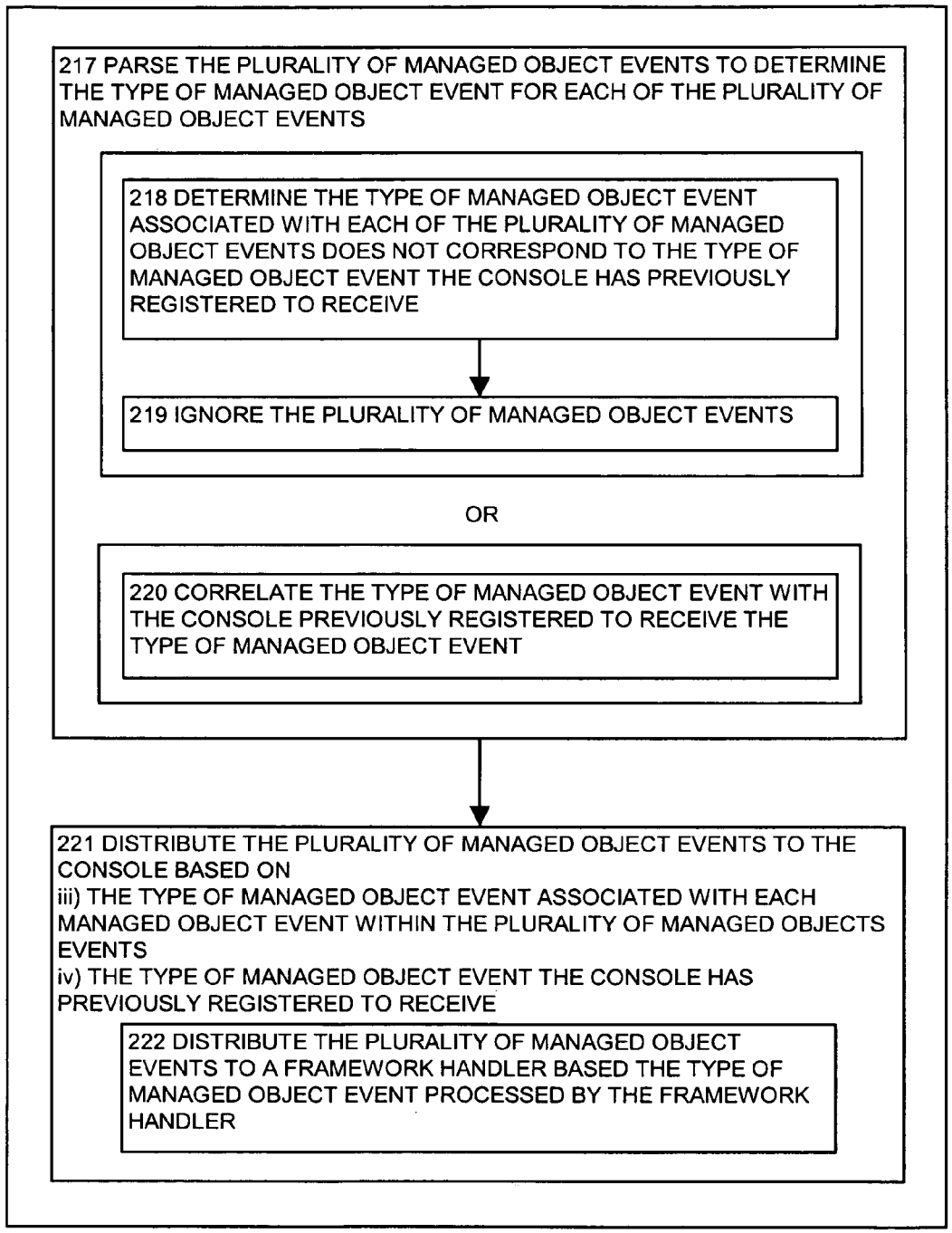
FIG. 5 illustrates a flowchart of a procedure performed by the system of FIG. 1 when the managed object events distributing process parses the plurality of managed object events to determine the type of managed object event for each of the plurality of managed object events, according to one embodiment disclosed herein.

FIG. 4 is a flowchart of the steps performed by the managed object events distributing process 135-2 when it receives a plurality of managed object events 163-N from a cache manager 120.

In step 212, the managed object events distributing process 135-2 receives a plurality of managed object events 163-N from a cache manager 120 where each managed object event 165-1 is associated with a managed object. The managed object events distributing process 135-2 receives a plurality of managed object events 163-N from a cache manager 120. Each managed object event 163-1 is associated with a managed object. A managed object selection represents a resource in a storage area network (SAN). The managed objects have software agents (i.e., software processes) running on the managed objects. The agents listen for events that occur on the managed objects. When an event occurs, the agents transmit information associated with those events to the database 110. The events are inserted into the database 110, triggering a cache manager application to group the managed object events by managed object event topic 161 (i.e., add managed object, remove managed object, modify managed object, modify a relationship associated with a managed object, etc), and managed object event class 162 (i.e., host, memory, switch, etc.). The managed object events distributing process 135-2, operating within a clearinghouse 130 computer system, 1 receives the plurality of managed object events 163-N from a cache manager 120. Thus, when managed object events 163-N are inserted into the database 110, the console 150 is refreshed with the data associated with those newly inserted managed object events 163-N.

In step 213, the managed object events distributing process 135-2 receives a payload object 160 including at least one managed object event 163-1. The payload object 160 is associated with one managed object event managed object event topic 161 type and one managed object event class type 162. The cache manager application bundles the managed object events by managed object event managed object event topic 161 and managed object event class 162 into a payload object 160. The managed object events distributing process 135-2, operating within a clearinghouse 130 computer system, receives the payload object 160 containing a plurality of managed object events 163-N. In an example configuration, the payload object 160 contains only one managed object event 163-1. Even if only one managed object event 163-1 is inserted into the database 110, the console manager 120 creates a payload object 160 for that single managed object event 163-N.

In step 214, the managed object events distributing process 135-2 parses the plurality of managed object events 163-N to determine the type of managed object event for each of the plurality of managed object events 163-N. In an example embodiment, a cache manager application groups managed object events by managed object event topic 161 (i.e., add managed object, remove managed object, modify managed object, modify a relationship associated with a managed object, etc), and managed object event class 162 (i.e., host, memory, switch, etc.). The cache manager application then bundles the managed object events by managed object event topic 161 and managed object event class 162 into a payload object 160, and transmits the payload object 160 (containing the plurality of managed object events 163-N) to the clearinghouse 130 computer system. The managed object events distributing process 135-2, operating on the clearinghouse 130 computer system, parses the plurality of managed object events 163-N contained within the payload object 160, to determine the type of managed object event for each of the plurality of managed object events 163-N. The type of managed object event can include a managed object event topic 161 (i.e., add managed object, remove managed object, modify managed object, modify a relationship associated with a managed object, etc), and a managed object event class 162 (i.e., host, memory, switch, etc.).

In step 215, the managed object events distributing process 135-2 identifies the type of managed object event 163-1 associated with the plurality of managed object events 163-N includes at least one of:
  i) a managed object event topic 161 type identifying an added managed object
  ii) a managed object event topic 161 type identifying a modified managed object
  iii) a managed object event topic 161 type identifying a removed managed object
  iv) a managed object event topic 161 type identifying a relationship, associated with a managed object, has been modified.

Alternatively, in step 216, the managed object events distributing process 135-2 identifies the type of managed object event associated with the plurality of managed object events includes at least one of:
  i) a managed object event class 162 type identifying a host object
  ii) a managed object event class 162 type identifying a memory object
  iii) a managed object event class 162 type identifying a switch object.

FIG. 4 is a flowchart of the steps performed by the managed object events distributing process 135-2 when it parses the plurality of managed object events 163-N to determine the type of managed object event for each of the plurality of managed object events 163-N.

In step 217, the managed object events distributing process 135-2 parses the plurality of managed object events 163-N to determine the type of managed object event for each of the plurality of managed object events 163-N. In an example embodiment, a cache manager application groups managed object events by topic 161 (i.e., add managed object, remove managed object, modify managed object, modify a relationship associated with a managed object, etc), and managed object event class 162 (i.e., host, memory, switch, etc.). The cache manager application then bundles the managed object events by managed object event topic 161 and managed object event class 162 into a payload object 160, and transmits the payload object 160 (containing the plurality of managed object events 163-N) to the clearinghouse 130 computer system. The managed object events distributing process 135-2, operating on the clearinghouse 130 computer system, parses the plurality of managed object events 163-N contained within the payload object 160, to determine the type of managed object event for each of the plurality of managed object events 163-N. The type of managed object event can include a managed object event topic 161 (i.e., add managed object, remove managed object, modify managed object, modify a relationship associated with a managed object, etc), and a managed object event class 162 (i.e., host, memory, switch, etc.).

In step 218, the managed object events distributing process 135-2 determines the type of managed object event associated with each of the plurality of managed object events 163-N does not correspond to the type of managed object event the console 150 has previously registered to receive. The manage object events 163-N are inserted into the database 110, triggering a cache manager application to group the managed object events by managed object event topic 161 (i.e., add managed object, remove managed object, modify managed object, modify a relationship associated with a managed object, etc), and managed object event class 162 (i.e., host, memory, switch, etc.). The cache manager application then bundles the managed object events by managed object event topic 161 and managed object event class 162 into a payload object 160. The managed object events distributing process 135-2, operating within a clearinghouse 130 computer system, receives the payload object 160 containing a plurality of managed object events 163-N. In an example embodiment, the managed object events distributing process 135-2 determines the type of managed object event associated with the managed object events 163-N contained within the payload object 160, do not correspond to the type of managed object even the console 150 has registered to receive.

In step 219, the managed object events distributing process 135-2 ignores the plurality of managed object events 163-N. In an example embodiment, the managed object events distributing process 135-2, operating within a clearinghouse 130 computer system, receives the payload object 160 containing a plurality of managed object events 163-N, and determines the type of managed object event associated with the managed object events 163-N contained within the payload object 160, do not correspond to the type of managed object even the console 150 has registered to receive. The managed object events distributing process 135-2 then ignores the payload object 160 containing the plurality of managed object events 163-N. Thus, the payload object 160 containing the plurality of managed object events 13-N is not distributed to the console 150.

Alternatively, in step 220, the managed object events distributing process 135-2 correlates the type of managed object event with the console 150 previously registered to receive the type of managed object event. In an example embodiment, The managed object events distributing process 135-2 receives notification 155 that console 150 registered to received managed object events 163-N based on the managed object event class 162 and the managed object event topic 161 associated with those managed object events 163-N. The managed object events distributing process 135-2 receives the plurality of managed object events 163-N contained within a payload object 160, and parses the plurality of managed object events 163-N to determine the type of managed object event for each of the plurality of managed object events 163-N. The managed object events distributing process 135-2 then correlates the type of managed object event with the type of managed object event the console 150 previously registered to receive.

In step 221, the managed object events distributing process 135-2 distributes the plurality of managed object events 163-N to the console 150 based on the type of managed object event associated with each managed object event 163-1 within the plurality of managed objects events 163-N, and the type of managed object event the console 150 has previously registered to receive. In an example embodiment, the managed object events distributing process 135-2, operating on the clearinghouse 130 computer system, receives a payload object 160 (containing the plurality of managed object events 163-N). The managed object events distributing process 135-2 parses the plurality of managed object events 163-N contained within the payload object 160, to determine the type of managed object event for each of the plurality of managed object events 163-N. The type of managed object event can include a managed object event topic 161 (i.e., add managed object, remove managed object, modify managed object, modify a relationship associated with a managed object, etc), and a managed object event class 162 (i.e., host, memory, switch, etc.). Based on the type of managed object event the console 150 has previously registered to receive, the managed object events distributing process 135-2 distributes the plurality of managed object events 163-N to the console 150 based on the managed object events 163-N. The type of managed object event can include a managed object event topic 161 (i.e., add managed object, remove managed object, modify managed object, modify a relationship associated with a managed object, etc), and a managed object event class 162 (i.e., host, memory, switch, etc.) of the managed object events 163-N.

In step 222, the managed object events distributing process 135-2 distributes the plurality of managed object events 163-N to a framework handler 140-1 based the type of managed object event processed by the framework handler 140-1. In an example embodiment, there exists a framework handler 140-1 for each of the managed object event topic 161 (i.e., add managed object, remove managed object, modify managed object, modify a relationship associated with a managed object, etc). For example, there exists a framework handler 140-1 for managed object events 163-N associated with added managed object, a framework handler 140-2 for managed object events 163-N associated with modified managed objects, a framework handler 140-3 for managed object events 163-N associated with removed managed objects, and a framework handler 140-4 for managed object events 163-N associated with modifications to relationships associated with managed objects. In an example embodiment, the managed object events distributing process 135-2 receives the payload object 160 containing the plurality of managed object events 163-N. The payload object 160 has one managed object event topic 161 and one managed object event class 162 associated with the payload object 160. The managed object events distributing process 135-2 distributes the plurality of managed object events 163-N to the appropriate framework handler 140-N based on the managed object managed object event topic 161 and one managed object event class 162 associated with the payload object 160.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method for distributing managed object events in a storage area network comprising:
   receiving notification at a computer that a console has registered to receive a type of managed object event from the computer;
   receiving a payload object at the computer including a plurality of managed object events from a cache manager, each managed object event associated with a managed object, the payload object bundled by the cache manager to include the plurality of managed object events associated with one managed object event topic type and one managed object event class type, the one managed object event topic type and the one managed object event class type common to each managed object event in the payload object such that there is one managed object event topic per the payload object and one manage object event class per the payload object;
   parsing the plurality of managed object events at the computer to determine the type of managed object event for each of the plurality of managed object events; and
   distributing the plurality of managed object events from the computer to the console based on
   i) the type of managed object event associated with each managed object event within the plurality of managed objects events; and
   ii) the type of managed object event the console has previously registered to receive from the computer.

2. The method of claim 1 comprising: receiving notification that the console has de-registered to receive the type of managed object event.

3. The method of claim 2 wherein receiving notification that the console has de-registered to receive the type of managed object event comprises:
   removing a managed object key from a managed object key table.

4. The method of claim 1 wherein receiving notification that the console has registered to receive a type of managed object event comprises:
   receiving notification that a plurality of sub processes operating on the console has registered to receive the type of managed object event;
   translating the type of managed object event to an object key; and
   adding the object key to a managed object key table.

5. The method of claim 1 wherein receiving notification that the console has registered to receive a type of managed object event comprises:
   receiving notification that the console has powered up.

6. The method of claim 1 wherein receiving notification that the console has registered to receive a type of managed object event comprises:
   receiving a selection from a user to view a managed object.

7. The method of claim 1 wherein parsing the plurality of managed object events to determine the type of managed object event for each of the plurality of managed object events comprises:
   identifying the type of managed object event associated with the plurality of managed object events includes at least one of:
   i) a topic type identifying an added managed object;
   ii) a topic type identifying a modified managed object;
   iii) a topic type identifying a removed managed object; and
   iv) a topic type identifying a relationship, associated with a managed object, has been modified.

8. The method of claim 1 wherein parsing the plurality of managed object events to determine the type of managed object event for each of the plurality of managed object events comprises:
- identifying the type of managed object event associated with the plurality of managed object events includes at least one of:
  - i) a class type identifying a host object;
  - ii) a class type identifying a memory object; and
  - iii) a class type identifying a switch object.

9. The method of claim 1 wherein parsing the plurality of managed object events to determine the type of managed object event for each of the plurality of managed object events comprises:
- determining the type of managed object event associated with each of the plurality of managed object events does not correspond to the type of managed object event the console has previously registered to receive; and
- ignoring the plurality of managed object events.

10. The method of claim 1 wherein parsing the plurality of managed object events to determine the type of managed object event for each of the plurality of managed object events comprises:
- correlating the type of managed object event with the console previously registered to receive the type of managed object event.

11. The method of claim 1 wherein distributing the plurality of managed object events to the console based on the type of managed object event associated with each managed object event within the plurality of managed objects events; and the type of managed object event the console has previously registered to receive comprises:
- distributing the plurality of managed object events to a framework handler based on the type of managed object event processed by the framework handler.

12. A computerized device comprising:
- a memory;
- a processor;
- a communications interface;
- an interconnection mechanism coupling the memory, the processor and the communications interface;
- wherein the memory is encoded with a managed object events distributing application that when executed on the processor distributes managed object events from the computerized device by causing the processor to perform the operations of:
- receiving notification that a console has registered to receive a type of managed object event;
- receiving a payload object including a plurality of managed object events from a cache manager, each managed object event associated with a managed object, the payload object bundled by the cache manager to include the plurality of managed object events associated with one managed object event topic type and one managed object event class type, the one managed object event topic type and the one managed object event class type common to each managed object event in the payload object such that there is one managed object event topic per the payload object and one manage object event class per the payload object;
- parsing the plurality of managed object events to determine the type of managed object event for each of the plurality of managed object events; and
- distributing the plurality of managed object events to the console based on
  - i) the type of managed object event associated with each managed object event within the plurality of managed objects events; and
  - ii) the type of managed object event the console has previously registered to receive.

13. The computerized device of claim 12 wherein when the computerized device performs the operation of receiving notification that the console has registered to receive a type of managed object event, the computerized device performs the operations of:
- receiving notification that a plurality of sub processes operating on the console has registered to receive the type of managed object event;
- translating the type of managed object event to an object key; and
- adding the object key to a managed object key table.

14. The computerized device of claim 12 wherein when the computerized device performs the operation of parsing the plurality of managed object events to determine the type of managed object event for each of the plurality of managed object events, the computerized device performs the operation of:
- identifying the type of managed object event associated with the plurality of managed object events includes at least one of:
  - i) a topic type identifying an added managed object;
  - ii) a topic type identifying a modified managed object;
  - iii) a topic type identifying a removed managed object; and
  - iv) a topic type identifying a relationship, associated with a managed object, has been modified.

15. The computerized device of claim 12 wherein when the computerized device performs the operation of parsing the plurality of managed object events to determine the type of managed object event for each of the plurality of managed object events, the computerized device performs the operation of:
- identifying the type of managed object event associated with the plurality of managed object events includes at least one of:
  - i) a class type identifying a host object;
  - ii) a class type identifying a memory object; and
  - iii) a class type identifying a switch object.

16. The computerized device of claim 12 wherein when the computerized device performs the operation of parsing the plurality of managed object events to determine the type of managed object event for each of the plurality of managed object events, the computerized device performs the operations of:
- determining the type of managed object event associated with each of the plurality of managed object events does not correspond to the type of managed object event the console has previously registered to receive; and
- ignoring the plurality of managed object events.

17. The computerized device of claim 12 wherein when the computerized device performs the operation of distributing the plurality of managed object events to the console based on the type of managed object event associated with each managed object event within the plurality of managed objects events; and the type of managed object event the console has previously registered to receive, the computerized device performs the operation of:
- distributing the plurality of managed object events to a framework handler based on the type of managed object event processed by the framework handler.

18. A non-transitory computer readable storage medium encoded with computer programming logic that when executed by a processor in a computerized device produces a managed object events distributing process that distributes managed object events by causing the computerized device to perform the operations of:

receiving notification that a console has registered to receive a type of managed object event;

receiving a payload object including a plurality of managed object events from a cache manager, each managed object event associated with a managed object, the payload object bundled by the cache manager to include the plurality of managed object events associated with one managed object event topic type and one managed object event class type, the one managed object event topic type and the one managed object event class type common to each managed object event in the payload object such that there is one managed object event topic per the payload object and one manage object event class per the payload object;

parsing the plurality of managed object events to determine the type of managed object event for each of the plurality of managed object events; and distributing the plurality of managed object events to the console based on
        i) the type of managed object event associated with each managed object event within the plurality of managed objects events; and
        ii) the type of managed object event the console has previously registered to receive.

\* \* \* \* \*